(12) United States Patent
Horita et al.

(10) Patent No.: US 9,321,491 B2
(45) Date of Patent: Apr. 26, 2016

(54) ROTATIONAL SPEED REDUCTION DEVICE FOR TRUCK TAILGATE

(75) Inventors: Naohiro Horita, Kanagawa (JP); Ryohei Kaneko, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/232,410

(22) PCT Filed: Jul. 19, 2012

(86) PCT No.: PCT/JP2012/004609
§ 371 (c)(1),
(2), (4) Date: Jan. 13, 2014

(87) PCT Pub. No.: WO2013/014891
PCT Pub. Date: Jan. 31, 2013

(65) Prior Publication Data
US 2014/0190779 A1    Jul. 10, 2014

(30) Foreign Application Priority Data

Jul. 28, 2011 (JP) ................................ 2011-166054

(51) Int. Cl.
| | | |
|---|---|---|
| F16D 57/00 | (2006.01) | |
| B62D 33/03 | (2006.01) | |
| F16F 9/14 | (2006.01) | |
| B62D 33/027 | (2006.01) | |
| E05F 5/02 | (2006.01) | |

(52) U.S. Cl.
CPC ............. *B62D 33/03* (2013.01); *B62D 33/027* (2013.01); *E05F 5/022* (2013.01); *F16F 9/145* (2013.01)

(58) Field of Classification Search
CPC .......................................................... F16F 9/145
USPC ..................... 188/290, 293, 294, 296; 296/50
See application file for complete search history.

(56) References Cited

U.S. PATENT DOCUMENTS

| | | | | |
|---|---|---|---|---|
| 1,926,800 | A * | 9/1933 | Casper ........................ | 188/308 |
| 1,991,201 | A * | 2/1935 | Fieldman ..................... | 188/286 |
| 5,152,189 | A * | 10/1992 | Miura et al. ................. | 464/180 |
| 6,390,255 | B2 * | 5/2002 | Kobori et al. ................ | 188/290 |
| 2004/0212210 | A1 | 10/2004 | Roach | |
| 2009/0139057 | A1 | 6/2009 | Honda et al. | |

FOREIGN PATENT DOCUMENTS

| | | |
|---|---|---|
| JP | 7-301272 | 11/1995 |
| JP | 7-301272 A | 11/1995 |
| JP | 2004-66896 | 3/2004 |
| JP | 2004-66896 A | 3/2004 |
| JP | 2004-323007 | 11/2004 |
| JP | 2007-063884 | 3/2007 |
| JP | 2007-327578 | 12/2007 |
| JP | 2007-327578 A | 12/2007 |
| JP | 2009-113511 | 5/2009 |

OTHER PUBLICATIONS

International Search Report for PCT/JP2012/004609 mailed Oct. 2, 2012.

* cited by examiner

*Primary Examiner* — Nicholas J Lane
(74) *Attorney, Agent, or Firm* — Nixon & Vanderhye P.C.

(57) ABSTRACT

A rotational speed reduction device 1 for a truck tailgate includes a housing 5, a rotor 8 disposed inside the housing 5, a viscous fluid 14*a* accommodated in an inner space 13*a*, passages 15*a* and 16*a* provided in the rotor 8, a one-way valve 19 disposed in the passage 15*a*, and a one-way valve 20*a* disposed in the passage 16*a*.

6 Claims, 6 Drawing Sheets

ROTATIONAL SPEED REDUCTION DEVICE FOR TRUCK TAILGATE

This application is the U.S. national phase of International Application No. PCT/JP2012/004609 filed 19 Jul. 2012 which designated the U.S. and claims priority to Japanese Application No. 2011-166054 filed 28 Jul. 2011, the entire contents of each of which are hereby incorporated by reference.

TECHNICAL FIELD

The present invention relates to a rotational speed reduction device which can be suitably used for controlling the rotational speed of the tailgate of a truck.

BACKGROUND ART

A tailgate which is hingedly connected to the vehicle body of a truck is opened and closed when a cargo is loaded or unloaded with respect to a load-carrying platform of the truck, and such opening and closing is normally effected manually.

PRIOR ART DOCUMENTS

Patent Documents

Patent Document 1: JP-A-2004-323007
Patent Document 2: JP-A-2009-113511

SUMMARY OF THE INVENTION

Problems that the Invention is to Solve

Meanwhile, in cases where the tailgate is rotated manually to open the platform, if the tailgate rotates abruptly without any resistance, the tailgate collides violently against a stopper defining a closed position of the tailgate, so that there is a possibility that a large noise is produced. On the other hand, in cases where the tailgate is rotated manually, if a large rotational torque is required, the closing of the platform becomes difficult. In any case, an appropriate resistance torque is required in the opening and closing of the tailgate, and a rotational speed reduction device which generates such a resistance torque is bound to be installed in a narrow space at an installation position of the tailgate, so that it is difficult to adopt a large rotational speed reduction device.

The present invention has been devised in view of the above-described aspects, and its object is to provide a rotational speed reduction device for a truck tailgate which is capable of causing the truck tailgate to be brought to an open position at a fixed speed while restraining the rapid rotation in the opening direction of the tailgate, which produces a small resistance torque with respect to the rotation in the closing direction of the truck tailgate to thereby allow the truck tailgate to be brought speedily to the closed position with a small force, and which can be formed in a compact size and is easy to use.

Means for Solving the Problems

A rotational speed reduction device for a truck tailgate in accordance with the present invention is comprised of: a housing having a cylindrical inner peripheral surface and an inward protrusion formed integrally on the inner peripheral surface in such a manner as to protrude radially inwardly from the inner peripheral surface; a rotor which has a cylindrical outer peripheral surface opposing the inner peripheral surface of the housing and has an outward protrusion formed integrally on the outer peripheral surface in such a manner as to protrude radially outwardly from the outer peripheral surface, and which is rotatably disposed inside the housing; a viscous fluid accommodated in an inner space which is defined by the inner peripheral surface of the housing, the outer peripheral surface of the rotor, and side surfaces of the inward protrusion opposing each other in a rotational direction, and which is partitioned into two, a first and a second, chambers, by the outward protrusion of the rotor; a first and a second passage provided in the rotor so as to allow the two, the first and the second, chambers to communicate with each other; a first one-way valve disposed in the first passage such that, in the rotation of the rotor with respect to the housing in one direction corresponding to the rotation in an opening direction of a truck tailgate, the flow of the viscous fluid from one of the two chambers to another one thereof through the first passage is allowed by an increase by more than a fixed level of the internal pressure of the viscous fluid in the one of the two chambers owing to the rotation in the one direction, whereas, in the rotation of the rotor with respect to the housing in another direction corresponding to the rotation in a closing direction of the truck tailgate, the flow of the viscous fluid from the other chamber to the one chamber through the first passage is inhibited; and a second one-way valve disposed in the second passage such that, in the rotation of the rotor with respect to the housing in the one direction, the flow of the viscous fluid from the one chamber to the other chamber through the second passage is inhibited, whereas, in the rotation of the rotor with respect to the housing in the other direction, the flow of the viscous fluid from the other chamber to the one chamber through the second passage is allowed, wherein the first one-way valve has a valve seat formed in the rotor, a spherical body which is seated on the valve seat and is movably disposed in the rotor, and a resilient member which is, at one end thereof, brought into contact with the spherical body so as to resiliently press the spherical body against the valve seat, the second passage has at least one notch formed in a protruding end of the outward protrusion, and the second one-way valve has a valve element provided at the protruding end of the outward protrusion movably in the rotational direction in such a manner as to straddle the protruding end of the outward protrusion, the valve element including a completely closing piece portion disposed on one surface of the outward protrusion which receives the internal pressure of the viscous fluid in the one chamber, so as to inhibit the flow of the viscous fluid from the one chamber to the other chamber through the second passage by closing the notch in the rotation of the rotor with respect to the housing in the one direction, an incompletely closing piece portion disposed on another surface of the outward protrusion which receives the internal pressure of the viscous fluid in the other chamber, so as to allow the flow of the viscous fluid from the other chamber to the one chamber through the second passage by partially closing the notch in the rotation of the rotor with respect to the housing in the other direction, and a connecting portion which is disposed at the protruding end of the outward protrusion and which is in contact with the inner peripheral surface of the housing and the protruding end of the outward protrusion slidably in the rotational direction, so as to connect together the completely closing piece portion and the incompletely closing piece portion.

According to the rotational speed reduction device for a truck tailgate in accordance with the present invention, in the rotation of the rotor with respect to the housing in one direction corresponding to the rotation in the opening direction of the tailgate of the truck, the second one-way valve inhibits the flow of the viscous fluid from one chamber to the other chamber through the second passage irrespective of the increase of the internal pressure of the viscous fluid in the one chamber, while, in the increase by less than a fixed level of the internal pressure of the viscous fluid in the one chamber due to that rotation in the one direction, the first one-way valve inhibits the flow of the viscous fluid from the one chamber to the other chamber through the second passage, with the result that resistance torque is generated with respect to the rotation of the rotor relative to the housing in the one direction, which corresponds to the rotation in the opening direction of the tailgate of the truck, in correspondence with the amount of increase in the internal pressure of the viscous fluid, whereas, in the increase by more than the fixed level of the internal pressure of the viscous fluid in the one chamber due to that rotation in the one direction, the first one-way valve allows the flow of the viscous fluid from the one chamber to the other chamber through the second passage, with the result that a fixed resistance torque is generated with respect to the rotation of the rotor relative to the housing in the one direction, which corresponds to the rotation in the opening direction of the tailgate of the truck, by suppressing a further increase of the internal pressure of the viscous fluid, thereby making it possible to suppress the rapid rotation of the tailgate of the truck in the opening direction and bringing the tailgate to the open position at a fixed velocity. Meanwhile, in the rotation of the rotor with respect to the housing in the other direction corresponding to the rotation in the closing direction of the tailgate of the truck, the first one-way valve inhibits the flow of the viscous fluid from the other chamber to the one chamber through the second passage irrespective of the increase in the internal pressure of the viscous fluid in the other chamber, while the second one-way valve allows the flow of the viscous fluid from the other chamber to the one chamber through the second passage, similarly irrespective of the increase in the internal pressure of the viscous fluid in the other chamber, with the result that a small resistance torque is generated with respect to the rotation of the rotor relative to the housing in the other direction corresponding to the rotation in the closing direction of the tailgate of the truck, so that it is possible to bring the tailgate of the truck rapidly to the closed position with a small force, thereby making it possible to provide a rotational speed reduction device for a truck tailgate which is easy to use.

In addition, in a preferred example, the housing includes a hollow cylindrical body having the cylindrical inner peripheral surface which defines the inner space and has the inward protrusion formed integrally thereon; a cover portion provided integrally on one axial end portion of the hollow cylindrical body; and a cover member which is attached at another axial end portion of the hollow cylindrical body and has a through hole in its center, and the rotor includes a rotor body which has the outer peripheral surface with the outward protrusion formed integrally thereon and a hollow cylindrical body which is fitted inside the rotor body, the first passage being formed in the rotor body and the hollow cylindrical body, the spherical body being disposed in a hollow portion of the hollow cylindrical portion, and the valve seat being formed in the hollow cylindrical body.

In the present invention, the inward protrusion may have a protrusion body formed integrally on the inner peripheral surface of the housing and a seal member by which a protruding end portion of the protrusion body is covered and which is brought into contact with the outer peripheral surface of the rotor slidably in the rotational direction, and if this seal member has abrasion resistance, sealability can be favorably maintained over extended periods of time.

In another preferred example of the present invention, the spherical body is disposed in the first passage such that, at the time of receiving the internal pressure of the viscous fluid from the other chamber in the rotation of the rotor with respect to the housing in the other direction, the spherical body is seated on the valve seat to close the first passage, whereas, at the time of receiving the internal pressure of the viscous fluid, which has increased by more than a fixed level, from the one chamber due to the rotation of the rotor with respect to the housing in the one direction, the spherical body is moved away from the valve seat to open the first passage.

At the time of receiving the internal pressure of the viscous fluid from the one chamber, the completely closing piece portion may be adapted to close the notch by coming into contact with the one surface of the outward protrusion, whereas, at the time when the incompletely closing piece portion receives the internal pressure of the viscous fluid from the other chamber, the completely closing piece portion may be adapted to move away from the surface of the outward protrusion in consequence of the movement of the connecting portion entailed by the movement of the incompletely closing piece portion toward the other surface of the outward protrusion.

In one example of the rotational speed reduction device for a truck tailgate in accordance with the present invention, the housing is adapted to be secured to a vehicle body of the truck, and the rotor is adapted to be coupled to a rotating shaft of the tailgate. Alternatively, the housing may be adapted to be coupled to the rotating shaft of the tailgate, and the rotor may be adapted to be secured to the vehicle body of the truck. In addition, when the rotational speed reduction device in accordance with the present invention is used for the tailgate of the truck, it suffices if the rotational speed reduction device in accordance with the present invention is disposed in a tail lamp accommodating case of the truck.

As the viscous fluid, it is possible to cite, by way of example, a silicone oil of, preferably, 100 to 1,000,000 cst, more preferably 10,000 to 100,000 cst, and, in a preferred example, the housing and the rotor body are formed of aluminum, the valve element, the hollow cylindrical body, and the seal member are formed of a synthetic resin, and the spherical body is constituted by a steel ball.

Advantages of the Invention

According to the present invention, it is possible to provide a rotational speed reduction device for a truck tailgate which is capable of causing the truck tailgate to be brought to the open position at a fixed speed while restraining the rapid rotation in the opening direction of the tailgate, which produces a small resistance torque with respect to the rotation in the closing direction of the truck tailgate to thereby allow the truck tailgate to be brought speedily to the closed position with a small force, and which can be formed in a compact size and is easy to use.

MODE FOR CARRYING OUT THE INVENTION

Figure 1:
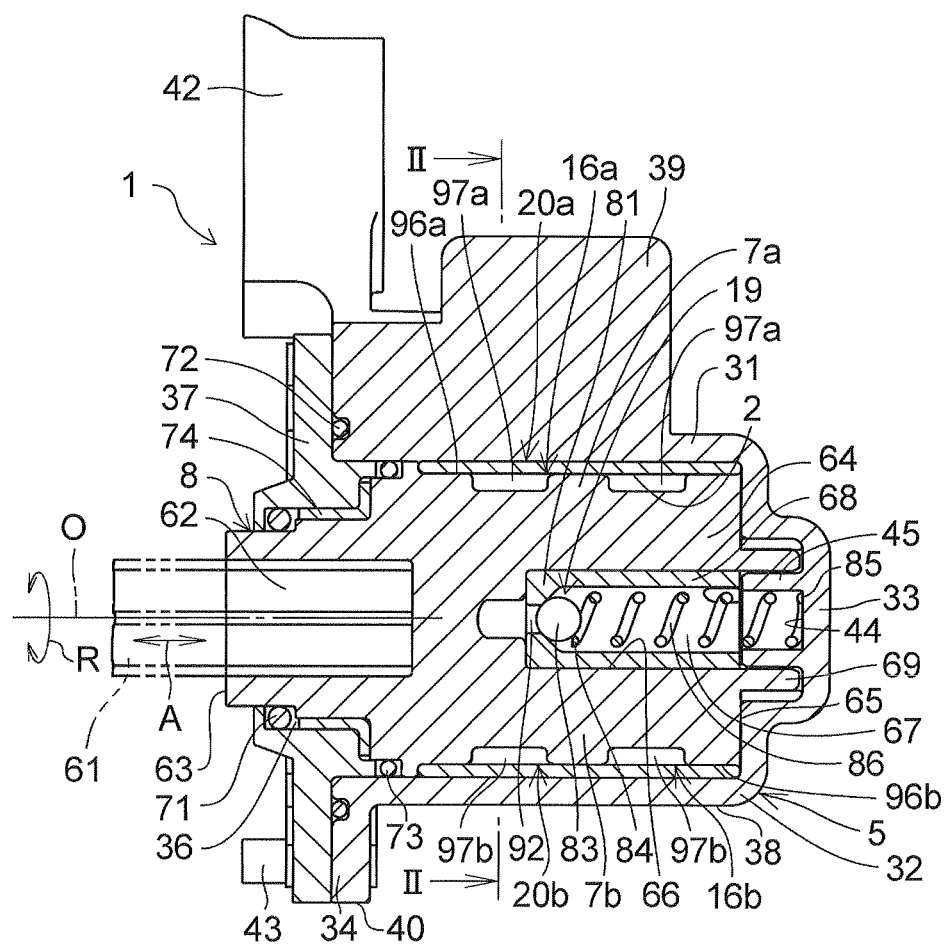
FIG. 1 is an explanatory cross-sectional view, taken in the direction of arrows along line I-I shown in FIG. 2, of an embodiment of the present invention.

Next, a more detailed description will be given of a mode for carrying out the invention with reference to the preferred embodiment illustrated in the drawings. It should be noted that the invention is not limited to the embodiment.

In FIGS. 1 to 7, a rotational speed reduction device 1 for a truck tailgate in accordance with this embodiment is comprised of a housing 5 having a cylindrical inner peripheral surface 2 and inward protrusions 3 and 4 formed integrally on the inner peripheral surface 2 in such a manner as to protrude radially inwardly from the inner peripheral surface 2; a rotor 8 which has a cylindrical outer peripheral surface 6 opposing the inner peripheral surface 2 of the housing 5 and has outward protrusions 7a and 7b formed integrally on the outer peripheral surface 6 in such a manner as to protrude radially outwardly from the outer peripheral surface 6, and which is disposed inside the housing 5 rotatably about an axis O in a rotational direction R; viscous fluids 14a and 14b respectively accommodated in inner spaces 13a and 13b which are defined by the inner peripheral surface 2 of the housing 5, the outer peripheral surface 6 of the rotor 8, and side surfaces 9a and 10a as well as 9b and 10b of the inward protrusions 3 and 4 opposing each other in the rotational direction R, and which are respectively partitioned into two chambers 11a and 12a as well as 11b and 12b by the outward protrusions 7a and 7b of the rotor 8; passages 15a and 16a as well as 15b and 16b provided in the rotor 8 so as to allow the two chambers 11a and 12a as well as 11b and 12b to communicate with each other; a one-way valve 19 disposed in the passages 15a and 15b such that, in the rotation of the rotor 8 with respect to the housing 5 about the axis O in one direction R1, which corresponds to the rotation in the opening direction of a tailgate 18 (see FIGS. 8 and 9) of a truck 17, the flow of each of the viscous fluids 14a and 14b from each of one chambers 11a and 11b of the two chambers to a corresponding one of the other chambers 12a and 12b through the passages 15a and 15b is allowed by an increase by more than a fixed level of the internal pressure of the viscous fluids 14a and 14b in the respective one chambers 11a and 11b of the two chambers 11a and 12a as well as 11b and 12b of the two chambers owing to the rotation in that direction R1, whereas, in the rotation of the rotor 8 with respect to the housing 5 about the axis O in another direction R2, which corresponds to the rotation in the closing direction of the tailgate 18 of the truck 17, the flow of each of the viscous fluids 14a and 14b from each of the chambers 12a and 12b to the corresponding one of the chambers 11a and 11b through the passages 15a and 15b is inhibited; and one-way valves 20a and 20b disposed in the passages 16a and 16b such that, in the rotation of the rotor 8 with respect to the housing 5 in the direction R1, the flow of each of the viscous fluids 14a and 14b from each of the chambers 11a and 11b to a corresponding one of the chambers 12a and 12b through the passages 16a and 16b is inhibited, whereas, in the rotation of the rotor 8 with respect to the housing 5 in the direction R2, the flow of each of the viscous fluids 14a and 14b from each of the chambers 12a and 12b to the corresponding one of the chambers 11a and 11b through the passages 16a and 16b is allowed.

Since the inner space 13a side and the inner space 13b side are constructed in a mutually similar manner, a description will be given hereafter of the inner space 13a side, and with respect to the inner space 13b side a reference character 'b' will be added to a corresponding component, and a description will be given thereof, as required.

The housing 5 includes a hollow cylindrical body 31 having the cylindrical inner peripheral surface 2 which defines the inner spaces 13a and 13b and has the inward protrusions 3 and 4 formed integrally thereon; a cover portion 33 provided integrally on one end portion 32 in an axial direction A of the hollow cylindrical body 31; a cover member 37 which is attached at a flange portion 34 at another end portion in the axial direction A of the hollow cylindrical body 31 by means of a plurality of rivets 35 and has a through hole 36 in its center; a rotation preventing plate portion 39 provided integrally on an outer peripheral surface 38 of the hollow cylindrical body 31; a mounting portion 42 provided integrally on an outer peripheral surface 40 of the flange portion 34 and having a through hole 41; a positioning projection 43 provided integrally on the outer peripheral surface 40 of the flange portion 34; and a cylindrical bearing portion 45 provided integrally on an inner side surface 44 of the cover portion 33. Such a housing 5 is adapted to be secured to a vehicle body 46 of the truck 17 by means of a bolt or the like which is inserted into the through hole 41 of the mounting portion 42.

Each of the inward protrusions 3 and 4 has a protrusion body 51 formed integrally on the inner peripheral surface 2 of the hollow cylindrical body 31 of the housing 5 and a cross-sectionally U-shaped seal member 53 by which a protruding end portion 52 of the protrusion body 51 is covered and which is brought into contact with the outer peripheral surface 6 of the rotor 8 slidably in the rotational direction R.

The rotor 8 includes a rotor body 64 which has the outer peripheral surface 6 with the outward protrusions 7a and 7b formed integrally thereon and which has at one end face 63 thereof a bottomed hole 62 with a detent to which a rotating shaft 61 of the tailgate 18 of the truck 17 is fitted; a synthetic resin-made hollow cylindrical body 68 which has a hollow portion 67 and is fitted and secured inside the rotor body 64 by being inserted in a bottomed hole 66 which is open at another end face 65 of the rotor body 64; and a hollow cylindrical shaft portion 69 which is integrally formed on the other end face 65 of the rotor body 64 and is supported by the bearing portion 45 rotatably in the rotational direction R in such a manner as to surround the bearing portion 45.

Seal rings 71, 72, and 73 for preventing the leakage of the viscous fluids 14a and 14b are disposed between the housing 5 and the rotor 8, and the rotor 8 on one side is supported at the hollow cylindrical shaft portion 69 by the bearing portion 45 rotatably in the rotational direction R, and on the other side is supported by the housing 5 rotatably in the rotational direction R by means of a flanged bush bearing 74 disposed between the same and the cover member 37.

The one-way valve 19, which is used commonly for the passages 15a and 16a as well as 15b and 16b, has a valve seat 81 formed in the hollow cylindrical body 68 of the rotor 8, a spherical body 83 constituted by a steel ball which is seated on the valve seat 81 and is movably disposed in the hollow portion 67 of the hollow cylindrical body 68, which is the interior of the rotor 8, and a coil spring 86 serving as a resilient member which is, at one end 84 thereof, brought into contact with the spherical body 83 so as to resiliently press the spherical body 83 against the valve seat 81 and is, at another end 85 thereof, brought into contact with the inner side surface 44 of the cover portion 33.

As the viscous fluid 14a accommodated in the inner space 13a, a silicone oil of 100 to 1,000,000 cst, preferably 10,000 to 100,000 cst, is used, and a silicone oil of 10,000 cst is used in one example.

The passage 15a, which is formed in the rotor body 64 and the hollow cylindrical body 68, includes a passage 91a which is formed in the rotor body 64 by being defined by an outer surface of the hollow cylindrical body 68 and which is open at one end thereof to the chamber 11a; a through hole 92 defined by the valve seat 81 in such a manner as to communicate at one end thereof with the passage 91a and communicate at another end thereof with the hollow portion 67; the hollow portion 67; a slit 93a formed in the hollow cylindrical body 68 and communicating at one end thereof with the hollow portion 67; and a slit 94a formed in the rotor body 64 and the hollow cylindrical shaft portion 69 and communicating at one end thereof with the slit 93a and open at another end thereof to the chamber 12a. At a position in which the rotor 8 has been rotated fully in the direction R2 (at the rotational position shown in FIG. 2), an open end 95a at another end of the slit 94a to the chamber 12a is sealed by the seal member 53 of the inward protrusion 3, and the through hole 92 and the hollow portion 67 are used commonly for the passage 15a and the passage 15b.

As such, the spherical body 83 is disposed in the passage 15a such that, at the time of receiving the internal pressure of the viscous fluid 14a from the chamber 12a in the rotation of the rotor 8 with respect to the housing 5 in the direction R2, the spherical body 83 is seated on the valve seat 81 to close the passage 15a, whereas, at the time of receiving the internal pressure of the viscous fluid 14a, which has increased by more than a fixed level, from the chamber 11a due to the rotation of the rotor 8 with respect to the housing 5 in the direction R1, the spherical body 83 is moved away from the valve seat 81 to open the through hole 92 in the passage 15a.

The one-way valve 20a for opening and closing the passage 16a, which has at least one, i.e., in this embodiment, two notches 97a formed in a protruding end 96a of the outward protrusion 7a, has a valve element 98a provided at the protruding end 96a of the outward protrusion 7a movably in the rotational direction R in such a manner as to straddle the protruding end 96a of the outward protrusion 7a.

The valve element 98a includes a completely closing piece portion 102a disposed on one surface 101a of the outward protrusion 7a which receives the internal pressure of the viscous fluid 14a in the chamber 11a, so as to inhibit the flow of the viscous fluid 14a from the chamber 11a to the chamber 12a through the passage 16a by closing the notches 97a in the rotation of the rotor 8 with respect to the housing 5 in the direction R1; an incompletely closing piece portion 104a disposed on another surface 103a of the outward protrusion 7a which receives the internal pressure of the viscous fluid 14a in the chamber 12a, so as to allow the flow of the viscous fluid 14a from the chamber 12a to the chamber 11a through the passage 16a by partially closing the notches 97a in the rotation of the rotor 8 with respect to the housing 5 in the direction R2; and a connecting portion 105a which is disposed at the protruding end 96a of the outward protrusion 7a and which is in contact with the inner peripheral surface 2 of the housing 5 and the protruding end 96a of the outward protrusion 7a slidably in the rotational direction R, so as to connect together the completely closing piece portion 102a and the incompletely closing piece portion 104a.

Figure 11:
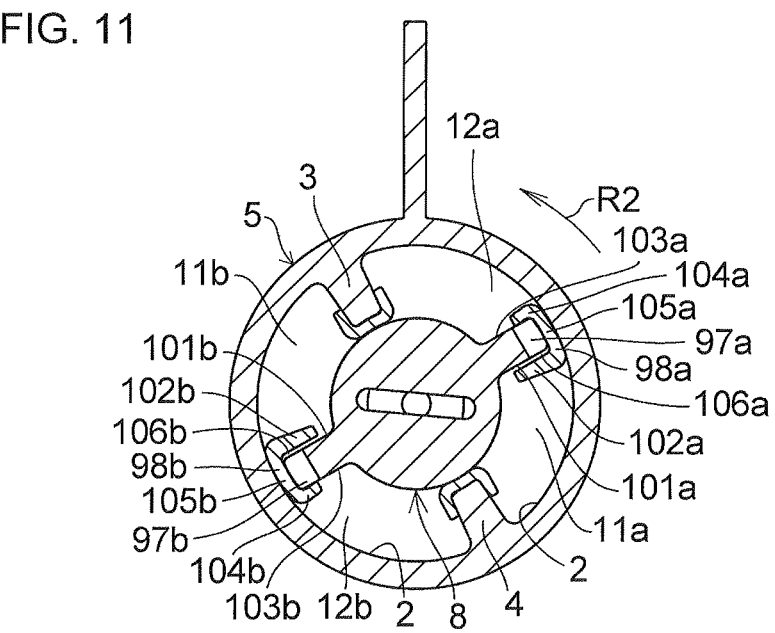
FIG. 11 is another diagram explaining the operation of the embodiment shown in FIG. 1.

At the time of receiving the internal pressure of the viscous fluid 14a from the chamber 11a, the completely closing piece portion 102a is adapted to close the respective notches 97a by coming into contact with the one surface 101a of the outward protrusion 7a, whereas, at the time when the incompletely closing piece portion 104a receives the internal pressure of the viscous fluid 14a from the chamber 12a, the completely closing piece portion 102a is adapted to move away from the surface 101a of the outward protrusion 7a to produce a gap 106a with respect to that surface 101a in consequence of the movement of the connecting portion 105a entailed by the movement of the incompletely closing piece portion 104a toward the other surface 103a of the outward protrusion 7a (see FIG. 11).

Figure 8:
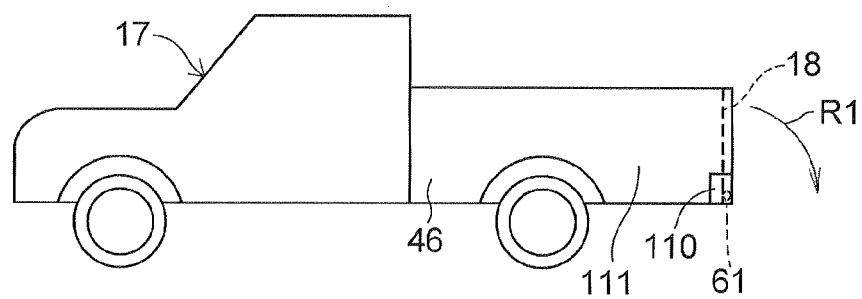
FIG. 8 is an explanatory diagram of a tailgate and the like of a truck.
Figure 9:
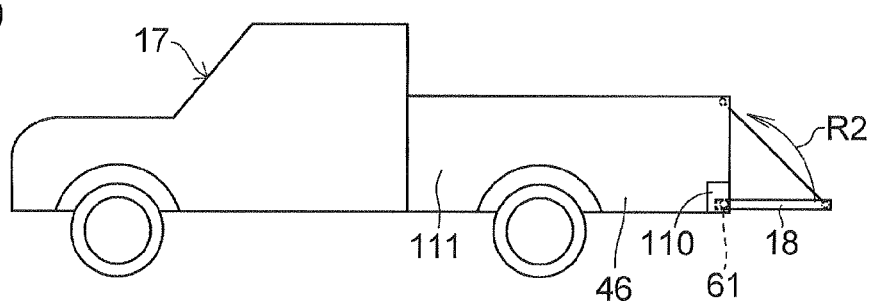
FIG. 9 is an explanatory diagram of the tailgate and the like of the truck.

In the truck 17 shown in FIGS. 8 and 9, for example, the above-described rotational speed reduction device 1 for a truck tailgate is used by being disposed in a tail lamp accommodating case 110 as the housing 5 is secured to the vehicle body 46 by means of the bolt or the like inserted in the through hole 41 of the mounting portion 42, such that its rotational position in the rotational direction R is positioned with respect to the vehicle body 46 by the positioning projections 43, and such that the housing 5 does not rotate in the rotational direction R with respect to the vehicle body 46 by the rotation preventing plate portion 39, and as the rotor 8 is coupled to the rotating shaft 61 of the tailgate 18 fitted in the bottomed hole 62 at one end thereof.

Figure 2:
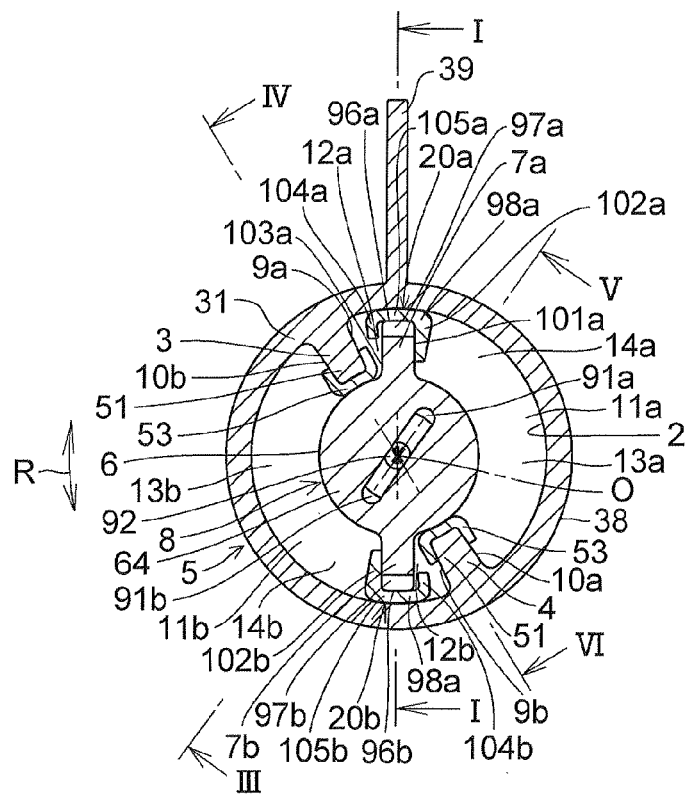
FIG. 2 is an explanatory cross-sectional view, taken in the direction of arrows along II-II, of the embodiment shown in FIG. 1.
Figure 3:
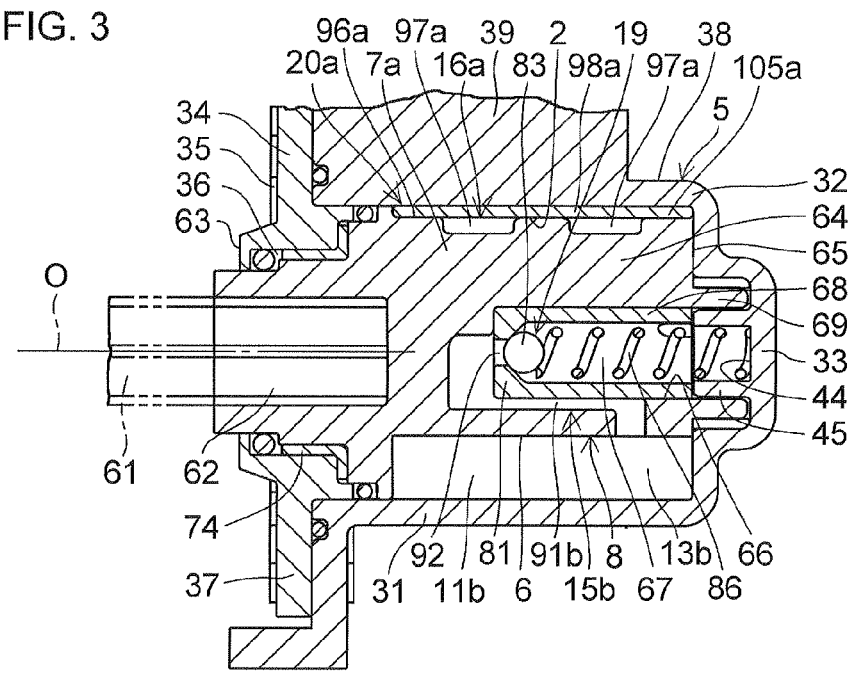
FIG. 3 is an explanatory cross-sectional view, taken in the direction of arrows along I-III, of the embodiment shown in FIG. 2.
Figure 4:
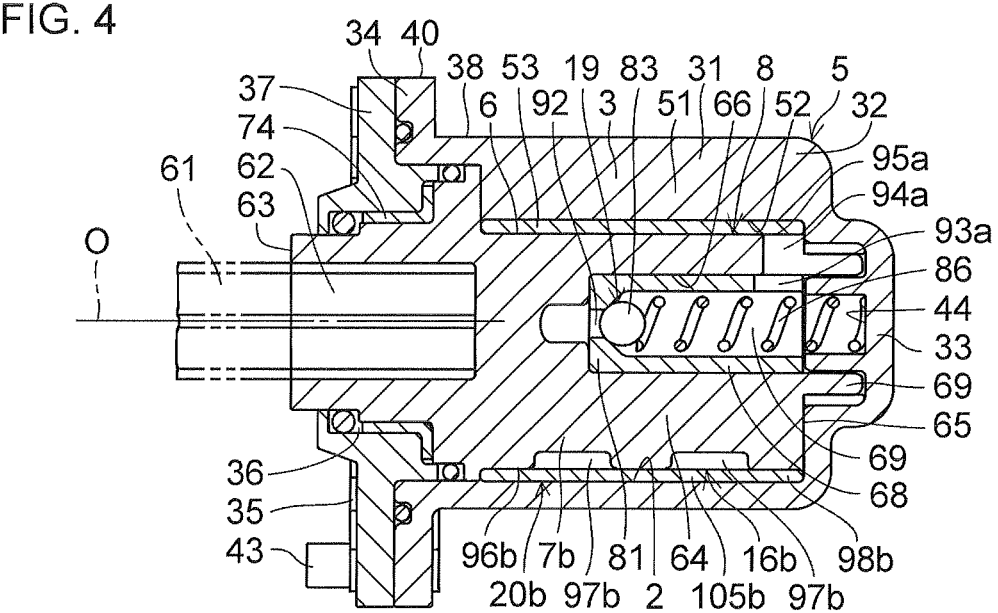
FIG. 4 is an explanatory cross-sectional view, taken in the direction of arrows along IV-I, of the embodiment shown in FIG. 2.
Figure 5:
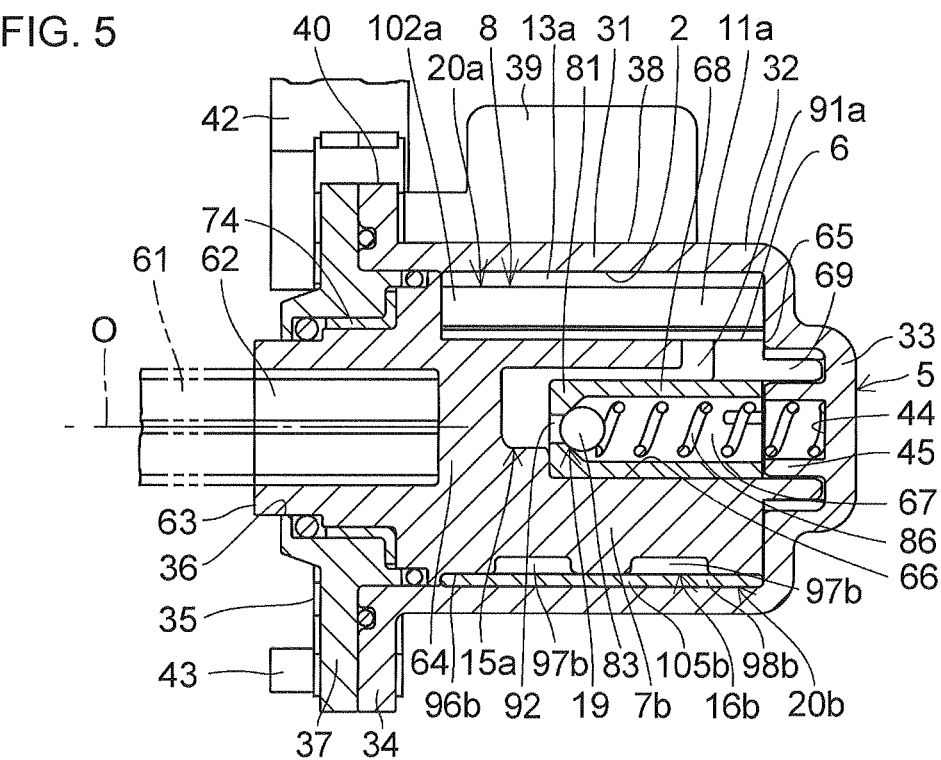
FIG. 5 is an explanatory cross-sectional view, taken in the direction of arrows along V-I, of the embodiment shown in FIG. 2.
Figure 6:
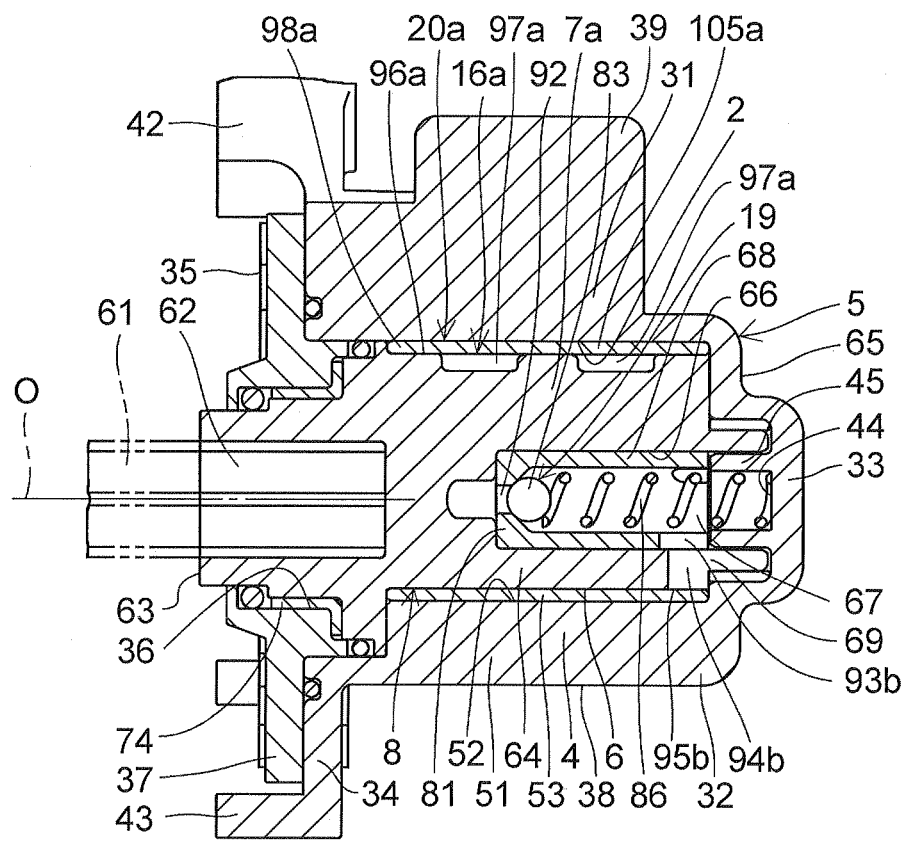
FIG. 6 is an explanatory cross-sectional view, taken in the direction of arrows along I-VI, of the embodiment shown in FIG. 2.
Figure 7:
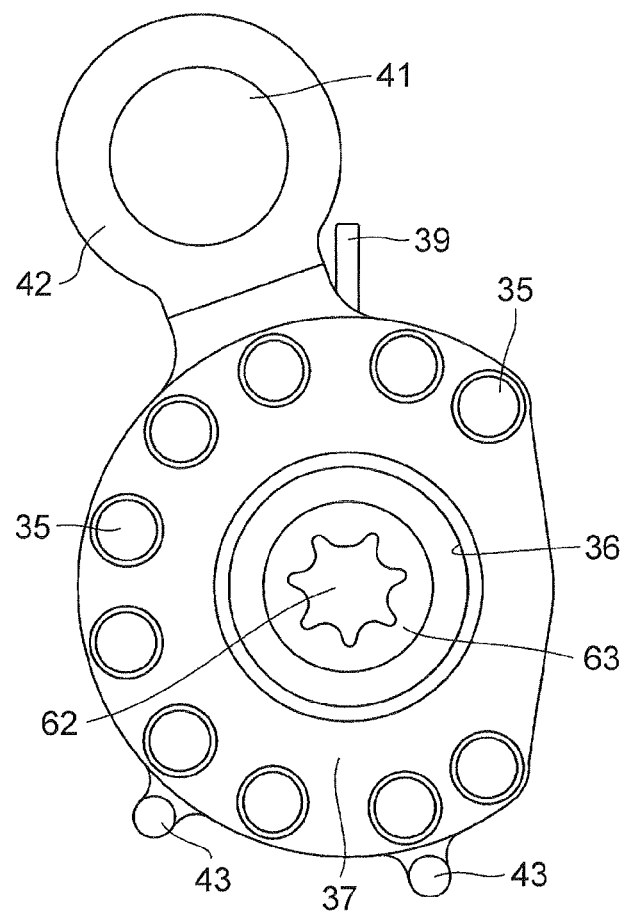
FIG. 7 is an explanatory left side view of the embodiment shown in FIG. 1.
Figure 10:
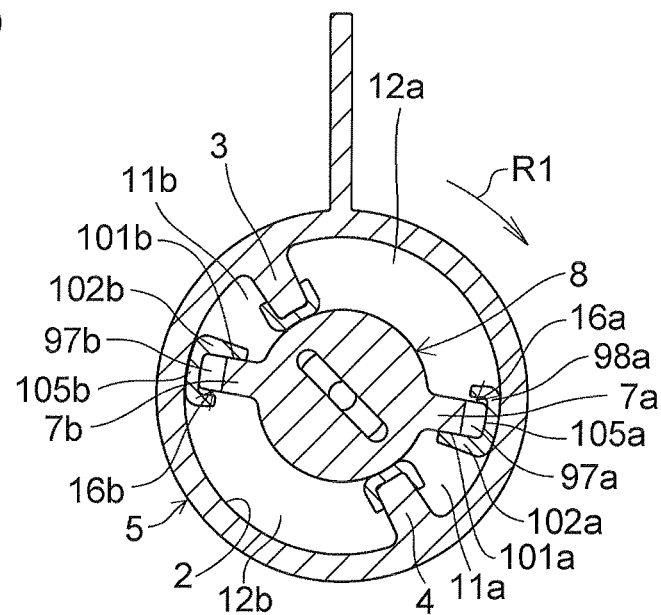
FIG. 10 is a diagram explaining the operation of the embodiment shown in FIG. 1.

In the rotational speed reduction device 1 for a tailgate which is disposed in the accommodating case 110 as the housing 5 is secured to the vehicle body 46 of the truck 17 and the rotor 8 is coupled to the rotating shaft 61, in the state in which a load-carrying platform 111 of the truck 17 is closed by the tailgate 18 (in the state shown in FIG. 8), the rotor 8 has been rotated so that the outward protrusion 7a is disposed as shown in FIG. 2 to set the chamber 11a to a maximum volume and set the chamber 12a to a minimum volume, and the spherical body 83 is seated on the valve seat 81 and the passage 15a is hence closed by the one-way valve 19. In this state, if the tailgate 18 closing the load-carrying platform 111 of the truck 17 is manually rotated in the direction R1 to open the load-carrying platform 111, the outward protrusion 7a of the rotor 8 is also rotated in the direction R1, by which rotation the valve element 98a is relatively moved in the direction R2 with respect to the outward protrusion 7a owing to the contact resistance caused by the contact of the connecting portion 105a against the inner peripheral surface 2 of the housing 5 and the internal pressure of the viscous fluid 14a in the chamber 11a, so that the completely closing piece portion 102a is brought into contact with the surface 101a of the outward protrusion 7a to completely close the notches 97a, and the valve element 98a closes the passage 16a, as shown in FIG. 10. As a result, the internal pressure of the viscous fluid 14a increases with the reduction of the volume of the chamber 11a, and resistance torque is generated with respect to the rotation of the rotor 8 in the direction R1 in correspondence with the amount of increase in the internal pressure of the viscous fluid 14a, whereby damping is imparted to the rotation of the tailgate 18 in the direction R1 for opening the load-carrying platform 111, to thereby prevent the rapid rotation of the tailgate 18 in the direction R1. Meanwhile, when the internal pressure of the viscous fluid 14a in the chamber 11a increases by more than a fixed level with the reduction of the volume of the chamber 11a, the spherical body 83 is moved away from the valve seat 81 against the resiliency of the coil spring 86, so that the one-way valve 19 opens the passage 15a to allow the viscous fluid 14a in the chamber 11a to flow into the chamber 12a through the passage 15a, to thereby stop the increase of the internal pressure of the viscous fluid 14a in the chamber 11a with the reduction of the volume of the chamber 11a. After the internal pressure of the viscous fluid 14a in the chamber 11a has increased by more than the fixed level, the increase of the resistance torque with respect to the rotation of the rotor 8 in the direction R1 is suppressed, and fixed damping is imparted to the rotation of the tailgate 18 in the direction R1 for opening the load-carrying platform 111, whereupon the tailgate 18 is brought to the state in which the load-carrying platform 111 of the truck 17 is open (to the state shown in FIG. 9). Meanwhile, in the state in which the load-carrying platform 111 of the truck 17 is opened by the tailgate 18 (in the state shown in FIG. 9), the rotor 8 has been rotated so that the outward protrusion 7a is disposed to set the chamber 11a to a minimum volume and set the chamber 12a to a maximum volume, and the spherical body 83 is seated on the valve seat 81 and the passage 15a is hence closed by the one-way valve 19. In this state, if the tailgate 18 which has opened the load-carrying platform 111 of the truck 17 is rotated in the direction R2 to close the load-carrying platform 111, the outward protrusion 7a of the rotor 8 is also rotated in the direction R2, by which rotation the valve element 98a is relatively moved in the direction R1 with respect to the outward protrusion 7a owing to the contact resistance caused by the contact of the connecting portion 105a against the inner peripheral surface 2 of the housing 5 and the internal pressure of the viscous fluid 14a in the chamber 12a, so that the incompletely closing piece portion 104a is brought into contact with the surface 103a of the outward protrusion 7a, while the completely closing piece portion 102a is moved away from the surface 101a of the outward protrusion 7a to produce the gap 106a between the completely closing piece portion 102a and the surface 103a of the outward protrusion 7a, whereby the notches 97a are opened so that the valve element 98a opens the passage 16a constituted by the notches 97a, as shown in FIG. 11. Consequently, the viscous fluid 14a in the chamber 12a easily flows into the chamber 11a through the passage 16a and the gap 106a, and the increase of the internal pressure of the viscous fluid 14a in the chamber 12a with the reduction of the volume of the chamber 12a is hence suppressed, with the result that the tailgate 18 is brought to the state in which the load-carrying platform 111 of the truck 17 is closed (to the state shown in FIG. 8) without substantially imparting damping to the rotation of the tailgate 18 in the direction R2 for closing the load-carrying platform 111.

As described above, according to the rotational speed reduction device 1 for a truck tailgate, in the rotation of the rotor 8 with respect to the housing 5 in the direction R1 corresponding to the rotation in the opening direction of the tailgate 18 of the truck 17, the one-way valve 20a inhibits the flow of the viscous fluid 14a from the chamber 11a to the chamber 12a through the passage 16a irrespective of the increase of the internal pressure of the viscous fluid 14a in the one chamber 11a, while, in the increase by less than a fixed level of the internal pressure of the viscous fluid 14a in the chamber 11a due to that rotation in the direction R1, the one-way valve 19 inhibits the flow of the viscous fluid 14a from the chamber 11a to the chamber 12a through the passage 15a, with the result that resistance torque is generated with respect to the rotation of the rotor 8 relative to the housing 5 in the direction R1, which corresponds to the rotation in the opening direction of the tailgate 18 of the truck 17, in correspondence with the amount of increase in the internal pressure of the viscous fluid 14a in the chamber 11a, whereas, in the increase by more than the fixed level of the internal pressure of the viscous fluid 14a in the chamber 11a due to that rotation in the direction R1, the one-way valve 19 allows the flow of the viscous fluid 14a from the chamber 11a to the chamber 12a through the passage 15a, with the result that a fixed resistance torque is generated with respect to the rotation of the rotor 8 relative to the housing 5 in the direction R1, which corresponds to the rotation in the opening direction of the tailgate 18 of the truck 17, by suppressing a further increase of the internal pressure of the viscous fluid 14a in the chamber 11a, thereby making it possible to suppress the rapid rotation of the tailgate 18 of the truck 17 in the opening direction and bringing the tailgate 18 to the open position at a fixed velocity. Meanwhile, in the rotation of the rotor 8 with respect to the housing 5 in the direction R2 corresponding to the rotation in the closing direction of the tailgate 18 of the truck 17, the one-way valve 19 inhibits the flow of the viscous fluid from the chamber 12a to the chamber 11a through the passage 15a irrespective of the increase in the internal pressure of the viscous fluid 14a in the chamber 12a, while the one-way valve 20a allows the flow of the viscous fluid 14a from the chamber 12a to the chamber 11a through the passage 16a, similarly irrespective of the increase in the internal pressure of the viscous fluid 14a in the chamber 12a, with the result that a small resistance torque is generated with respect to the rotation of the rotor 8 relative to the housing 5 in the direction R2 corresponding to the rotation in the closing direction of the tailgate 18 of the truck 17, so that it is possible to bring the tailgate 18 of the truck 17 rapidly to the closed position with a small force, thereby making it possible to provide the tailgate 18 of the truck 17 which is easy to use.

The above-described operation is effected in the same way on the inner space 13b side as well.

With the rotational speed reduction device 1 for a truck tailgate in the above-described embodiment, the two inner spaces 13a and 13b are formed by the inward protrusions 3 and 4; however, in the present invention, one inner space may be formed by a single inward protrusion, and this one inner space may be partitioned into two chambers by a single outward protrusion, and, furthermore, three or more inner spaces may be formed by three or more inward protrusions, and each of these inner spaces may be partitioned into two chambers by the outward protrusion.

DESCRIPTION OF REFERENCE NUMERALS AND SIGNS

1: rotational speed reduction device
2: inner peripheral surface
3, 4: inward protrusion
5: housing
6: outer peripheral surface
7a, 7b: outward protrusion
8: rotor
9a, 9b, 10a, 10b: side surface
11a, 11b, 12a, 12b: chamber
13a, 13b: inner space
14a, 14b: viscous fluid 15*a*, 15*b*, 16*a*, 16*b*: passage
17: truck
18: tailgate
19: one-way valve

The invention claimed is:

1. A rotational speed reduction device for a truck tailgate comprising:
a housing having a cylindrical inner peripheral surface and an inward protrusion formed integrally on the inner peripheral surface in such a manner as to protrude radially inwardly from the inner peripheral surface;
a rotor which has a cylindrical outer peripheral surface opposing the inner peripheral surface of said housing and has an outward protrusion formed integrally on the outer peripheral surface in such a manner as to protrude radially outwardly from the outer peripheral surface, and which is rotatably disposed inside said housing;
a viscous fluid accommodated in an inner space which is defined by the inner peripheral surface of said housing, the outer peripheral surface of said rotor, and side surfaces of the inward protrusion opposing each other in a rotational direction, and which is partitioned into two, a first and a second, chambers, by the outward protrusion of said rotor;
a first and a second passage provided in said rotor so as to allow the two, the first and the second, chambers to communicate with each other;
a first one-way valve disposed in said first passage such that, in the rotation of said rotor with respect to said housing in one direction corresponding to the rotation in an opening direction of a truck tailgate, the flow of said viscous fluid from one of the two chambers to another one thereof through said first passage is allowed by an increase by more than a fixed level of the internal pressure of said viscous fluid in the one of the two chambers owing to the rotation in the one direction, whereas, in the rotation of said rotor with respect to said housing in another direction corresponding to the rotation in a closing direction of the truck tailgate, the flow of said viscous fluid from the other chamber to the one chamber through said first passage is inhibited; and
a second one-way valve disposed in said second passage such that, in the rotation of said rotor with respect to said housing in the one direction, the flow of said viscous fluid from the one chamber to the other chamber through said second passage is inhibited, whereas, in the rotation of said rotor with respect to said housing in the other direction, the flow of said viscous fluid from the other chamber to the one chamber through said second passage is allowed,
wherein said first one-way valve has a valve seat formed in said rotor, a spherical body which is seated on the valve seat and is movably disposed in said rotor, and a resilient member which is, at one end thereof, brought into contact with the spherical body so as to resiliently press the spherical body against the valve seat,
said second passage has at least one notch formed in a protruding end of the outward protrusion, and
said second one-way valve has a valve element provided at the protruding end of the outward protrusion movably in the rotational direction in such a manner as to straddle the protruding end of the outward protrusion,
the valve element including a completely closing piece portion disposed on one surface of the outward protrusion which receives the internal pressure of said viscous fluid in the one chamber, so as to inhibit the flow of said viscous fluid from the one chamber to the other chamber through said second passage by closing the notch in the rotation of said rotor with respect to said housing in the one direction, an incompletely closing piece portion disposed on another surface of the outward protrusion which receives the internal pressure of said viscous fluid in the other chamber, so as to allow the flow of said viscous fluid from the other chamber to the one chamber through said second passage by partially closing the notch in the rotation of said rotor with respect to said housing in the other direction, and a connecting portion which is disposed at the protruding end of the outward protrusion and which is in contact with the inner peripheral surface of said housing and the protruding end of the outward protrusion slidably in the rotational direction, so as to connect together the completely closing piece portion and the incompletely closing piece portion,
wherein said rotor includes a rotor body which has the outer peripheral surface of the rotor with the outward protrusion formed integrally thereon and a first hollow cylindrical body which is fitted inside the rotor body, said first passage being formed in the rotor body and the first hollow cylindrical body, the spherical body being disposed in a hollow portion of the first hollow cylindrical portion, and the valve seat being formed in the first hollow cylindrical body, and
said first passage includes a third passage which is formed in the rotor body by being defined by an outer surface of the first hollow cylindrical body and which is open at one end thereof to the one chamber; a through hole defined by the valve seat in such a manner as to communicate at one end thereof with the third passage and communicate at another end thereof with the hollow portion; a first slit formed in the first hollow cylindrical body and communicating at one end thereof with the hollow portion; and a second slit formed in the rotor body and communicating at one end thereof with the first slit and open at another end thereof to the other chamber.

2. The rotational speed reduction device for a truck tailgate according to claim 1, wherein said housing includes a second hollow cylindrical body having the cylindrical inner peripheral surface which defines the inner space and has the inward protrusion formed integrally thereon, a cover portion provided integrally on one axial end portion of the second hollow cylindrical body, and a cover member which is attached at another axial end portion of the second hollow cylindrical body and has a through hole in its center.

3. The rotational speed reduction device for a truck tailgate according to claim 1, wherein the inward protrusion has a protrusion body formed integrally on the inner peripheral surface of the housing and a seal member by which a protruding end portion of the protrusion body is covered and which is brought into contact with the outer peripheral surface of said rotor slidably in the rotational direction.

4. The rotational speed reduction device for a truck tailgate according to claim 1, wherein the spherical body is disposed in said first passage such that, at the time of receiving the internal pressure of said viscous fluid from the other chamber in the rotation of said rotor with respect to said housing in the other direction, the spherical body is seated on the valve seat to close said first passage, whereas, at the time of receiving the internal pressure of said viscous fluid, which has increased by more than a fixed level, from the one chamber due to the rotation of said rotor with respect to said housing in the one direction, the spherical body is moved away from the valve seat to open said first passage.

5. The rotational speed reduction device for a truck tailgate according to claim 1, wherein, at the time of receiving the internal pressure of said viscous fluid from the one chamber, the completely closing piece portion is adapted to close the notch by coming into contact with the one surface of the outward protrusion, whereas, at the time when the incompletely closing piece portion receives the internal pressure of said viscous fluid from the other chamber, the completely closing piece portion is adapted to move away from the surface of the outward protrusion in consequence of the movement of the connecting portion entailed by the movement of the incompletely closing piece portion toward the other surface of the outward protrusion.

6. The rotational speed reduction device for a truck tailgate according to claim 1, wherein said housing is adapted to be secured to a vehicle body of the truck, and said rotor is adapted to be coupled to a rotating shaft of the tailgate.

\* \* \* \* \*